United States Patent
Kogure

(10) Patent No.: US 10,506,122 B2
(45) Date of Patent: Dec. 10, 2019

(54) INFORMATION PROCESSING APPARATUS AND METHOD FOR CONTROLLING THE SAME

(71) Applicant: CANON KABUSHIKI KAISHA, Tokyo (JP)

(72) Inventor: Takeshi Kogure, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/669,740

(22) Filed: Aug. 4, 2017

(65) Prior Publication Data

US 2018/0048781 A1    Feb. 15, 2018

(30) Foreign Application Priority Data

Aug. 9, 2016    (JP) ................................. 2016-156321

(51) Int. Cl.
*H04N 1/00*    (2006.01)
*H04N 1/32*    (2006.01)

(52) U.S. Cl.
CPC ..... *H04N 1/00941* (2013.01); *H04N 1/00424* (2013.01); *H04N 1/00498* (2013.01); *H04N 1/00514* (2013.01); *H04N 1/32625* (2013.01); *H04N 2201/0094* (2013.01)

(58) Field of Classification Search
CPC ........... H04N 1/00941; H04N 1/00424; H04N 1/00498; H04N 1/00514; H04N 1/32625; H04N 2201/0094
USPC ........................................................ 358/1.15
See application file for complete search history.

(56) References Cited

U.S. PATENT DOCUMENTS

| 2003/0023839 | A1* | 1/2003 | Burkhardt ................. G06F 8/63 713/1 |
| 2004/0184108 | A1* | 9/2004 | Takano .............. H04N 1/00413 358/400 |
| 2006/0111953 | A1* | 5/2006 | Setya ..................... G06Q 10/06 705/7.26 |
| 2009/0080013 | A1* | 3/2009 | Sato ................... H04N 1/00204 358/1.15 |
| 2010/0067035 | A1* | 3/2010 | Kawakubo ......... H04N 1/00222 358/1.13 |
| 2013/0014006 | A1* | 1/2013 | Abellera ............. G06F 3/04817 715/234 |

(Continued)

FOREIGN PATENT DOCUMENTS

JP    2005-165772 A    6/2005
JP    2014-075088 A    4/2014

*Primary Examiner* — Neil R McLean

(74) *Attorney, Agent, or Firm* — Canon U.S.A., Inc. IP Division

(57) ABSTRACT

An information processing apparatus loaded with an application for extending functionality of the information processing apparatus, includes a storage unit configured to, before occurrence of an event relating to an application, store display information including a display item relating to the application and displayed on a display unit of the information processing apparatus, and a display control unit configured to, after occurrence of the event relating to the application, update display relating to the display item according to the display information corresponding to the event stored in the storage unit, under control of a control program that runs on an operating system and provides a framework for managing the application.

7 Claims, 21 Drawing Sheets

(56) References Cited

U.S. PATENT DOCUMENTS

2015/0264206 A1* 9/2015 Maeda ............... H04N 1/00509
                                              358/1.13
2016/0065788 A1* 3/2016 Hosoda ............... H04N 1/4433
                                              358/1.13

* cited by examiner

FIG. 8

| FORM NAME 801 | BUTTON ID 802 | FORM IMAGE FILE 803 | PRINT SETTING 804 | ICON IMAGE FILE 805 | LOCALIZE 806 | DISPLAY POSITION 807 | APPLICABLE USER 808 |
|---|---|---|---|---|---|---|---|
| MUSICAL SCORE | 0 | score.dat | Settings1.dat | Icon1.dat | Localize1.dat | TOP | ALL |
| APPLICATION FORM | 1 | SYORUI.dat | Settings2.dat | Icon2.dat | NONE | TAIL | USER A |

FIG. 9

| APPLICATION ID 901 | BUTTON ID 902 | ICON TITLE 903 | DISPLAY POSITION 904 | ICON IMAGE INFORMATION 905 |
|---|---|---|---|---|
| 1 | 0 | MUSICAL SCORE | TOP | PIXEL DATA IN Icon1.dat |
| 1 | 1 | APPLICATION FORM | TAIL | PIXEL DATA IN Icon2.dat |

FIG. 13

| APPLICATION ID | APPLICATION |
|---|---|
| 1 | APPLICATION 1 |
| 2 | APPLICATION 2 |

```
2001  {
      "appId" : "1",
2002  "name": "appName",
2003  "version": "0000",
2004  "event" : [
          {
2005      "type": ["changedConsumable"],
2006      "script": "handlerA",
2007      "function": "handlerA"
          },
          {
2008      "type": ["timer"],
2009      "script": "handlerB",
2010      "function": "handlerB",
2011      "interval": 60
          }
      ]
      }
```

INFORMATION PROCESSING APPARATUS AND METHOD FOR CONTROLLING THE SAME

BACKGROUND

Field of the Disclosure

The present disclosure relates to an information processing apparatus loaded with applications and a method for controlling the information processing apparatus.

Description of the Related Art

According to Japanese Patent Application Laid-Open No. 2014-75088, systems including an image forming apparatus in which extended applications are installed to extend the functionality of the image forming apparatus have been widely used. These systems have an execution environment for running the extended applications separately from a control application for the image forming apparatus.

Japanese Patent Application Laid-Open No. 2005-165772 discusses a technique by which, when a printer driver is installed into an apparatus such as a personal computer with no severe restriction on resources, a plurality of icons is registered and displayed according to a plurality of print settings for one printer.

SUMMARY

According to an aspect of the present disclosure, an information processing apparatus loaded with an application for extending functionality of the information processing apparatus includes a storage unit configured to, before occurrence of an event relating to an application, store display information including a display item relating to the application and displayed on a display unit of the information processing apparatus, and a display control unit configured to, after occurrence of the event relating to the application, update display relating to the display item according to the display information corresponding to the event stored in the storage unit, under control of a control program that runs on an operating system and provides a framework for managing the application.

Further features of the present invention will become apparent from the following description of present exemplary embodiments with reference to the attached drawings.

BRIEF DESCRIPTION OF THE DRAWINGS

FIG. 8 is a table illustrating an example of application setting information according to one or more aspects of the present disclosure.

FIG. 9 is a table illustrating an example of icon registration information according to one or more aspects of the present disclosure.

FIG. 13 is a table illustrating an example of application management information according to one or more aspects of the present disclosure.

FIG. 20 is a diagram illustrating an example of application meta-information according to one or more aspects of the present disclosure.

DESCRIPTION OF THE EMBODIMENTS

An exemplary embodiment of the present disclosure will be described below with reference to the drawings.

Figure 1:
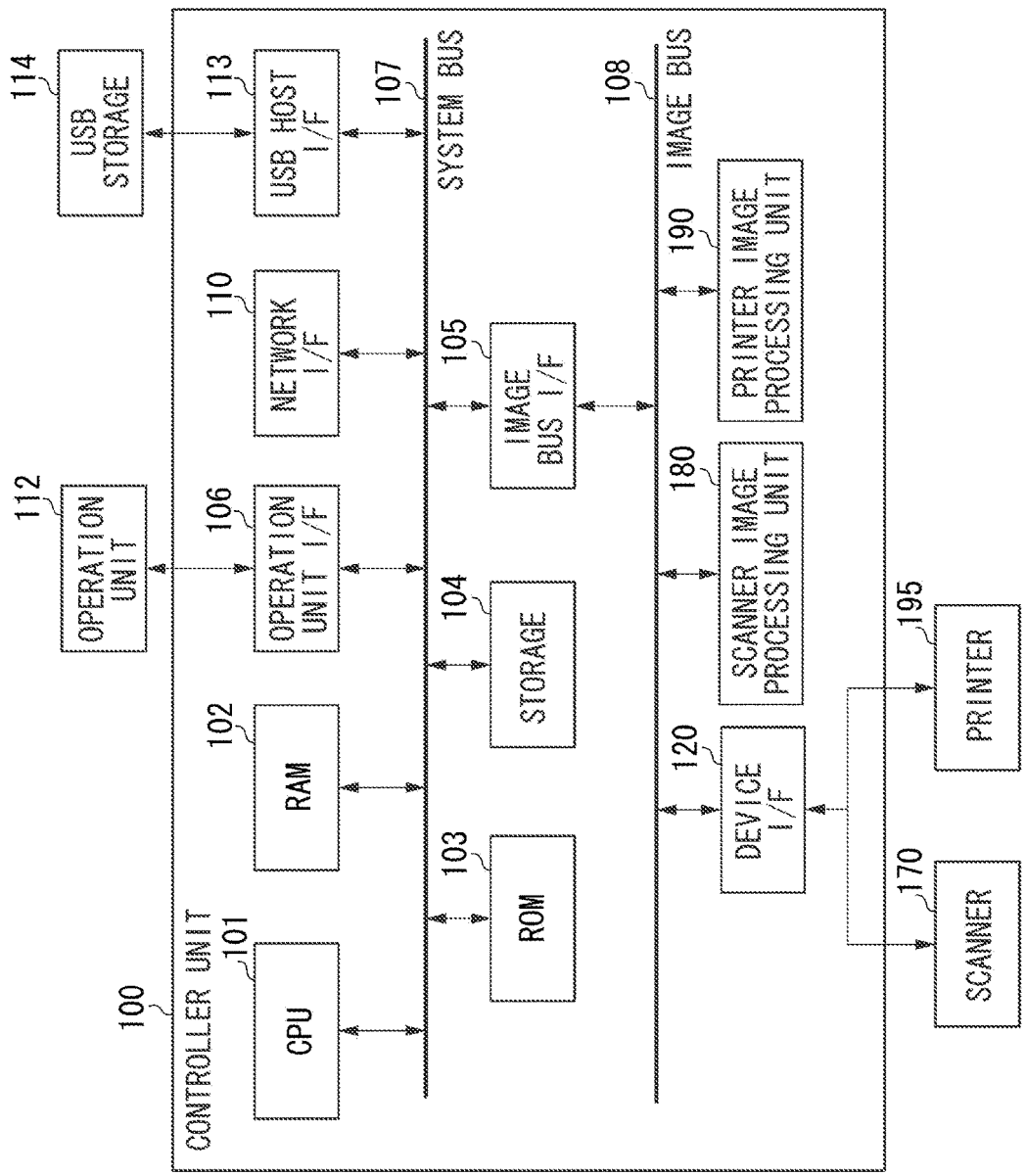
FIG. 1 is a block diagram illustrating an example of a hardware configuration in an image forming apparatus according to one or more aspects of the present disclosure.

FIG. 1 is a block diagram illustrating an example of a hardware configuration in an image forming apparatus 401 according to the exemplary embodiment. The image forming apparatus 401 includes a controller unit 100. A scanner 170 serving as an image input device, a printer 195 serving as an image output device, and an operation unit 112 are connected to the controller unit 100. The controller unit 100 performs a control to implement a copying function of causing the printer 195 to print and output image data read by the scanner 170.

The controller unit 100 has a central processing unit (CPU) 101 that starts an operating system (OS) by a boot strap program stored in a read only memory (ROM) 103. The CPU 101 executes applications stored in a storage 104 on the OS to perform various processes. The CPU 101 uses a random access memory (RAM) 102 as a work area. The RAM 102 provides the work area and an image memory area for temporarily storing image data. The storage 104 stores applications and image data. The CPU 101 is an example of a processor. The processor may be an arithmetic circuit such as a micro processing unit (MPU).

The units described below are connected to the CPU 101 via a system bus 107. The ROM 103, the RAM 102, and an operation unit interface (operation unit I/F) 106 are connected to the system bus 107. In addition, a network interface (network I/F) 110, a Universal Serial Bus (USB) host I/F 113, and an image bus interface (image bus I/F) 105 are connected to the system bus 107. The operation unit I/F 106 is an interface with the operation unit 112 having a touch panel and outputs to the operation unit 112 the image data to be displayed on the operation unit 112. The operation unit I/F 106 also sends information input by a user with the operation unit 112 to the CPU 101. The network I/F 110 is an interface that connects the image forming apparatus 401 to a local area network (LAN).

The USB host I/F 113 is an interface unit that communicates with a USB storage 114. The USB host I/F 113 is an output unit to store the data stored in the storage 104 into the USB storage 114. The USB host I/F 113 receives the data from the USB storage 114 and passes the same to the CPU 101. The USB storage 114 is an external storage device that stores data and is detachably attached to the USB host I/F 113. A plurality of USB devices including the USB storage 114 is connectable to the USB host I/F 113.

The image bus I/F 105 is a bus bridge that connects the system bus 107 to an image bus 108 for transferring image data at a high speed to convert the data format. The image bus 108 includes a Peripheral Component Interconnect (PCI) bus or IEEE1394. A device I/F 120, a scanner image processing unit 180, and a printer image processing unit 190 are provided on the image bus 108. A scanner 270 and the printer 195 are connected to the device I/F 120, and the device I/F 120 performs synchronous/non-synchronous transformation on the image data. The scanner image processing unit 180 corrects, processes, or edits the input image data. The printer image processing unit 190 performs, on the print output image data, correction or resolution change according to the printer 195.

Figure 2:
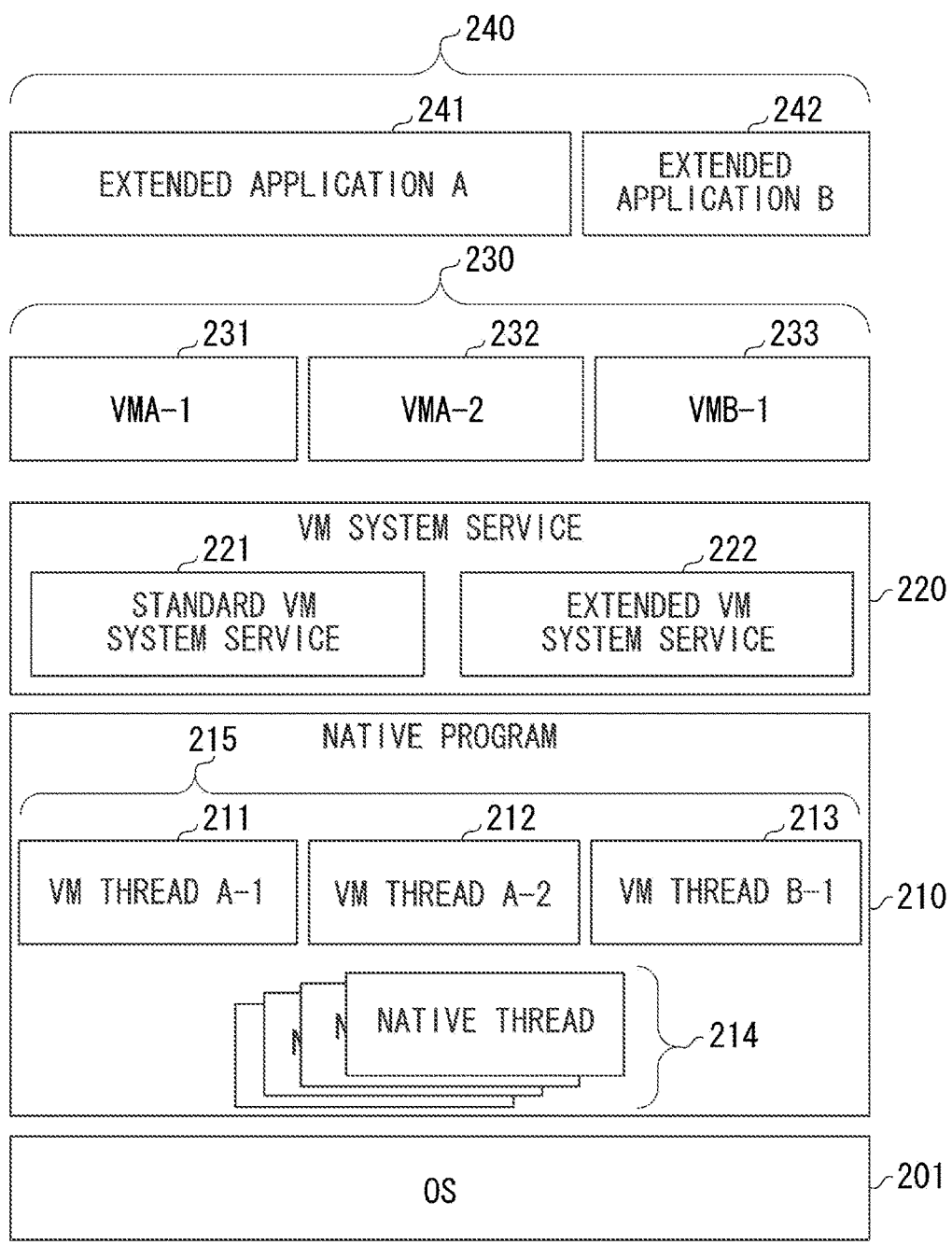
FIG. 2 is a block diagram illustrating an example of a software configuration in the image forming apparatus according to one or more aspects of the present disclosure.

FIG. 2 is a diagram illustrating an example of a software configuration in the image forming apparatus 401 according to the present exemplary embodiment.

The CPU 101 loads an application from the storage 104 into the RAM 102 and executes the application to implement the functions of the modules illustrated in FIG. 2. A native program 210 for controlling image processing units such as a printer, a fax, and a scanner and virtual machine (VM) 230 serving as an execution environment for extended applications (also called simply applications) run on an OS 201 as an operating system for incorporated devices. The VM 230 is a module to interpret and execute an application for controlling extended applications. For example, the VM 230 may be an interpreter implemented by software such as JAVA (registered trademark). The VM 230 may be a script language or the like as far as it is compiled once into bytecodes and then is interpreted and executed by VM as software. For example, the native program 210 may be implemented by Lua language. The extended applications run on the VM 230. The VM 230 is a software module that runs on the CPU 101 in the present exemplary embodiment, but may be a hardware circuit. In the following description, the CPU 101 and at least part of the hardware circuit may be simply referred to as a processor.

The native program 210 includes native threads 214 for controlling image processing units such as a printer, a fax, and a scanner and VM threads 215 for operating the virtual machine 230. The number of the VM threads corresponds to the number of the VMs 230. In this example, three threads 211, 212, and 213 are produced.

A VM system service 220 is a utility library used in common by the extended applications. By calling the function of the VM system service 220 from an extended application 240, extended applications need not to be developed and the modules in the image forming apparatus 401 becomes accessible. The VM system service 220 includes a standard VM system service 221 that runs as an indispensable VM and an extended VM system service 222 that provides access to the modules in the image forming apparatus 401 and offers the function of an OS.

The VM 230 executes the extended application 240. The VM 230 is generated for respective threads in the extended application. In FIG. 2, a VM A-1 231 and a VM A-2 232 are generated to operate two threads in an extended application A 241, and a VM B-1 233 is generated to operate one thread in an extended application B 242.

Respective icons for the extended applications are displayed on a main menu screen on the operation unit 112 of the image forming apparatus 401. When the operation unit I/F 106 detects that the user has selected one of the icons through the operation unit 112, the operation unit I/F 106 notifies the CPU 101 of the detection. Upon receipt of the notification, the CPU 101 starts the extended application selected by the user. The mechanism of display will be described below in detail.

Figure 3:
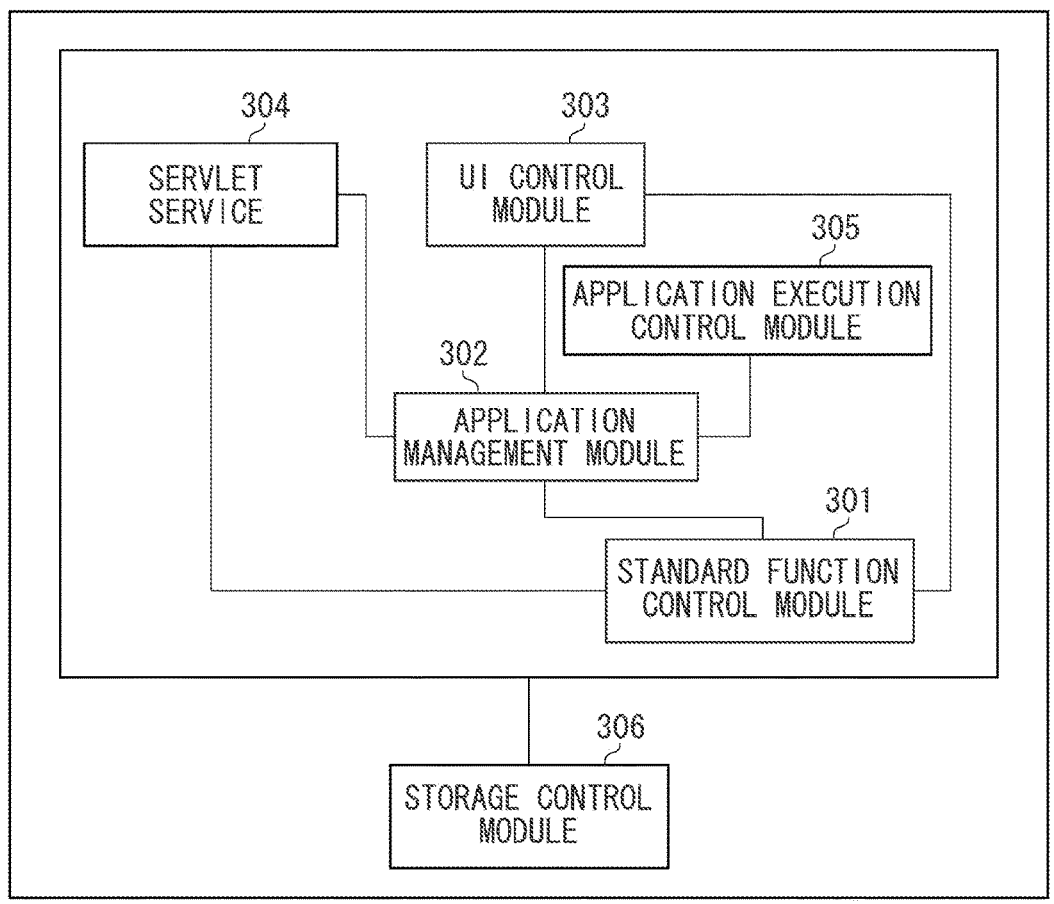
FIG. 3 is a block diagram illustrating an example of a software configuration in the image forming apparatus according to one or more aspects of the present disclosure.

FIG. 3 is a diagram illustrating a configuration of software modules operating on the CPU 101 of the image forming apparatus 401 according to the present exemplary embodiment. FIG. 3 illustrates an example of a software configuration in the image forming apparatus 401 according to the present exemplary embodiment. A servlet service 304 is a module Hypertext Transfer Protocol (HTTP)-accessed through the network I/F 110 to accept a request and assign the process to an application management unit 302 or a standard function control unit 301 depending on the accessed Uniform Resource Locator (URL). A user interface (UI) control unit 303 is a module that displays a screen on the operation unit 112 to accept an operation from the user and provide the operation information to a relevant module (the application management unit 302 or the standard function control unit 301). The application management unit 302 is a module that manages installation and starting of extended applications. An application execution control unit 305 is a module that controls the execution of applications started by the application management unit 302. Specifically, the application execution control unit 305 controls the VM threads 215, the VM system services 220, the VM 230, and the extended application 240. A storage control unit 306 is a module that records and manages setting information in the image forming apparatus 401. The modules access the storage control unit 306 to refer to or set the setting values. The standard function control unit 301 is a module that controls the copy and fax functions of the image forming apparatus 401 as standard functions and performs other controls necessary for the image forming apparatus 401 (for example, the control of the USB host I/F 113). The programs stored in the RAM 102, the ROM 103, the storage 104, and the USB storage 114 illustrated in FIG. 1 are schematically represented as modules illustrated in FIGS. 2 and 3. The programs are executed by the CPU 101 to implement the respective operations.

Figure 4:
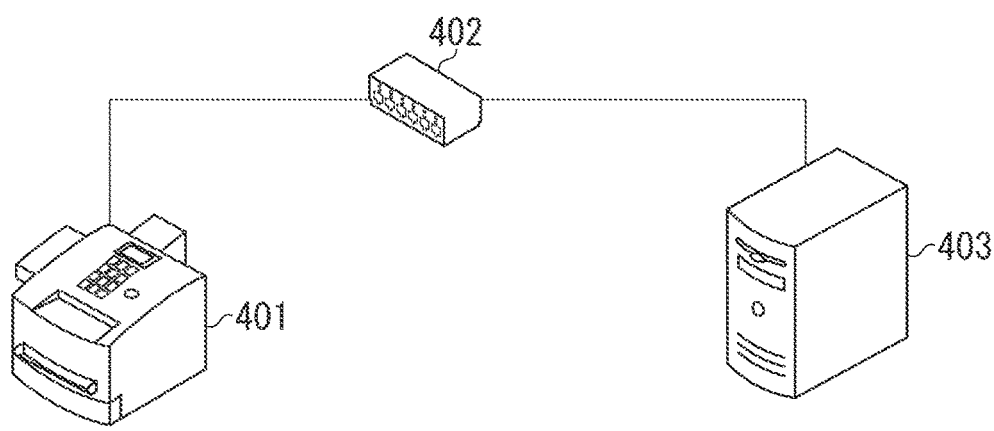
FIG. 4 is a diagram illustrating an example of an entire network according to one or more aspects of the present disclosure.

FIG. 4 is a diagram illustrating an example of the entire network according to the present exemplary embodiment. The print system includes the image forming apparatus 401, a network router 402, and an external device 403. The external device 403 connects to the image forming apparatus 401 via a network to install an extended application via an installer, or connects to the image forming apparatus 401 by a browser to change the settings of the extended application. The network router 402 mediates the communications between the image forming apparatus 401 and the external device 403. The image forming apparatus 401 installs an extended application in response to a request for installation from the external device 403 or returns a HTTP response to a HTTP request.

Figure 5:
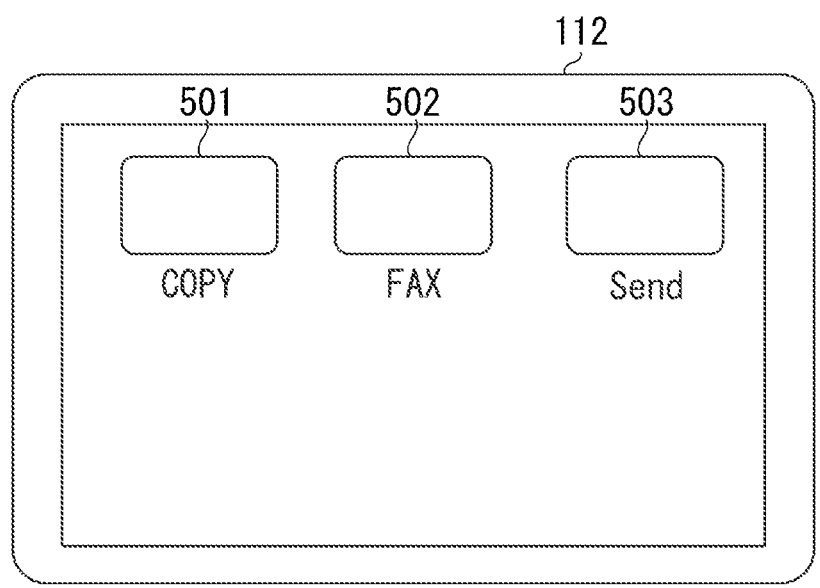
FIG. 5 is a diagram illustrating an example of an operation screen in the image forming apparatus according to one or more aspects of the present disclosure.

FIG. 5 is a diagram illustrating an example of an operation screen in the image forming apparatus 401 according to the present exemplary embodiment.

The screen illustrated in FIG. 5 is displayed on the operation unit 112. The image forming apparatus 401 has the copy, fax, send (sending scanned images) functions. The icons for calling these functions are displayed on the operation unit 112. When the user operates the operation unit 112 and presses the icon representing a desired function, the displayed screen is switched to a screen for performing the function. FIG. 5 illustrates the icons as examples of display items.

Figure 6:
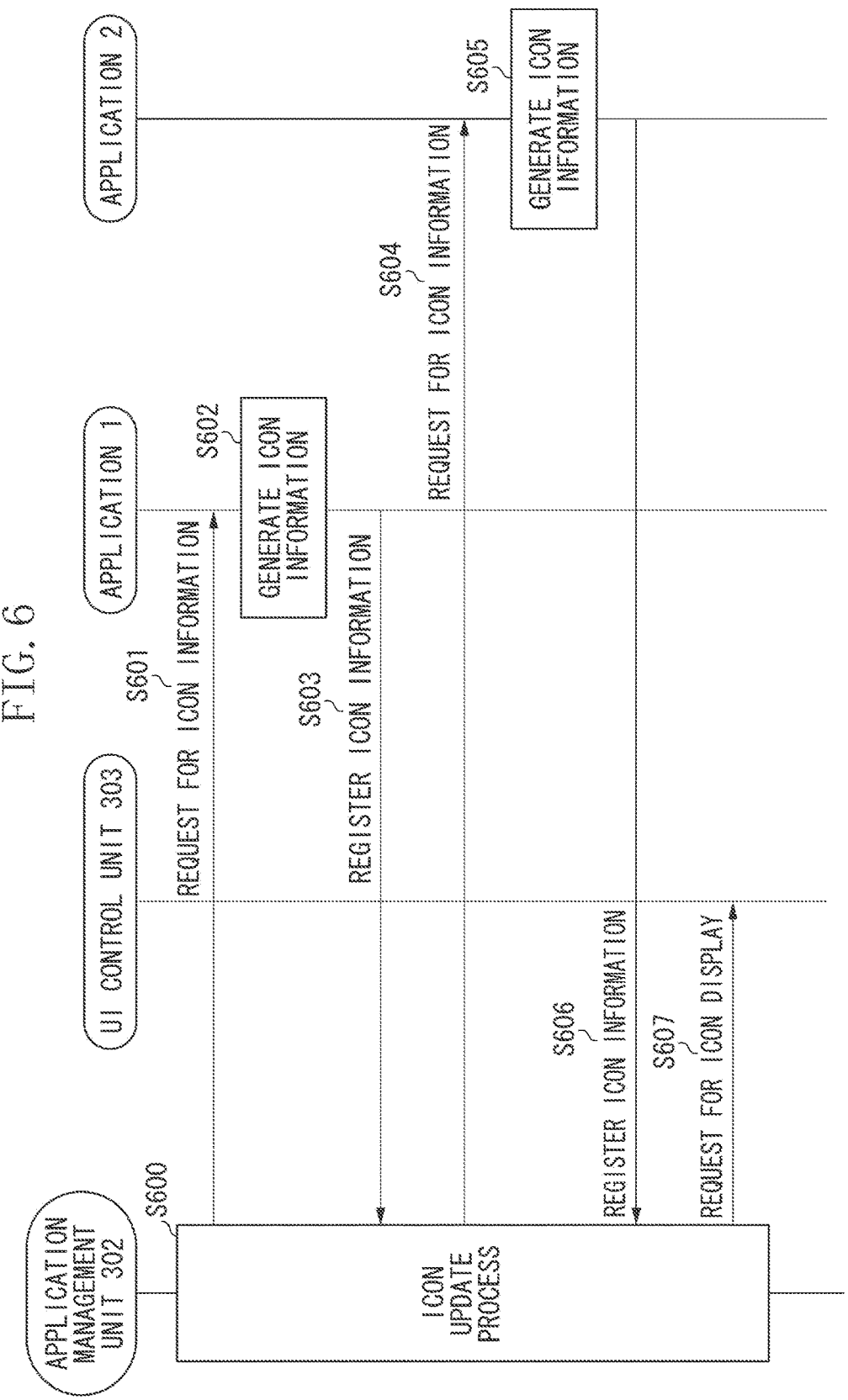
FIG. 6 is a sequence diagram illustrating an example of an icon update process sequence according to one or more aspects of the present disclosure.

FIG. 6 is a diagram illustrating an example of an icon update process sequence according to the present exemplary embodiment.

FIG. 6 illustrates an example of the flow of an icon updating process for acquiring and displaying icons for extended applications installed in the image forming apparatus 401. The following description is based on the assumption that two applications, an application 1 and an application 2, are installed in advance. The application 1 corresponds to the extended application A 241 illustrated in FIG. 2, for example. The application 2 corresponds to the extended application B 242, for example.

Figure 14:
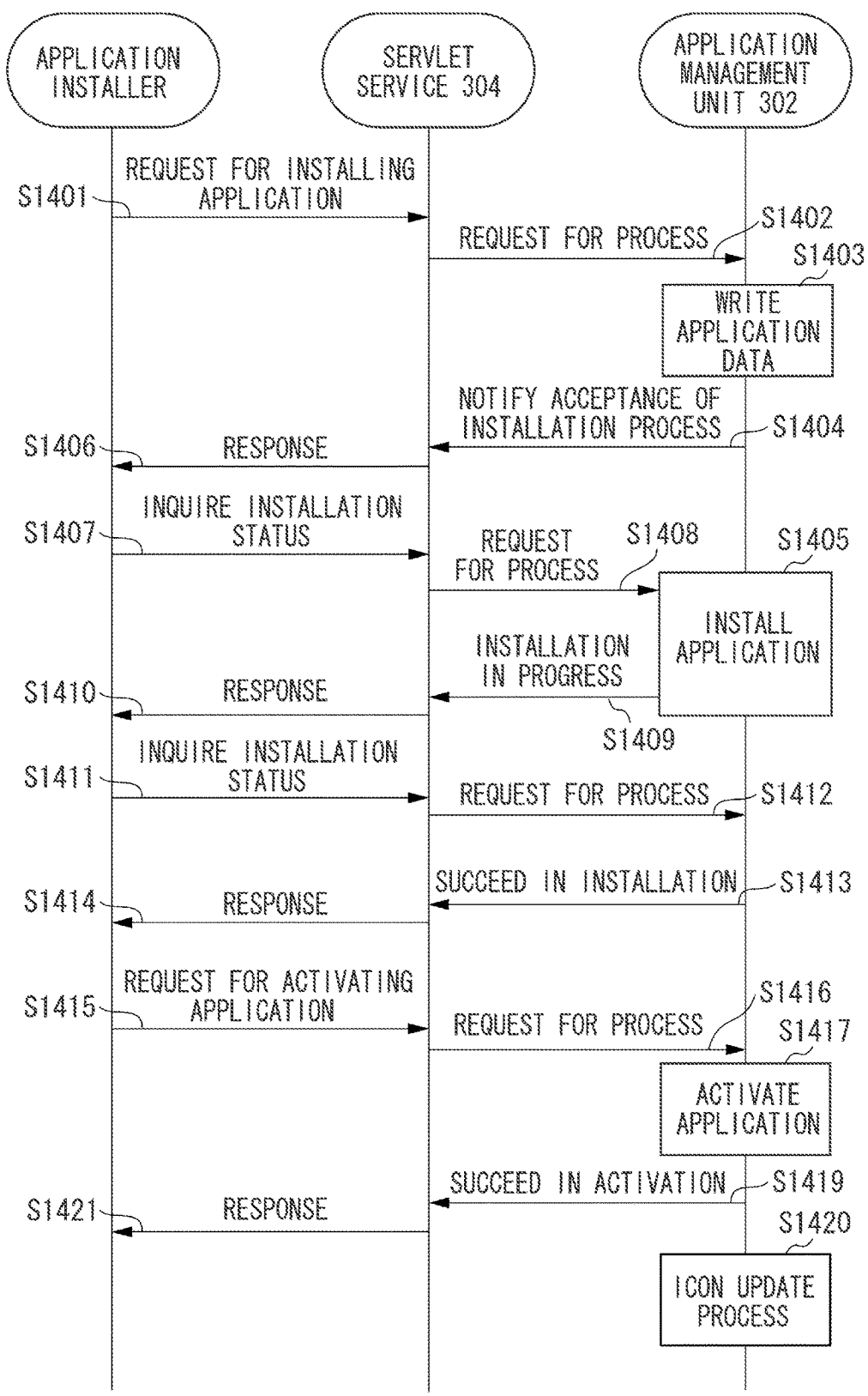
FIG. 14 is a sequence diagram illustrating an example of an installation sequence according to one or more aspects of the present disclosure.

This process is started when the application management unit 302 performs a predetermined operation such as notifying successful activation of the application in FIG. 14 (step S1420), for example. The process is also started at the timing of step S1712 in FIG. 17. The processes in FIGS. 6 and 7 are executed under the control of the CPU 101.

In step S601, the application management unit 302 requests icon information from the installed application 1. In step S602, upon receipt of the icon information request, the application 1 performs an icon information generation process illustrated in FIG. 7 to generate icon information. In step S603, the application 1 registers the generated icon information. In step S604, the application management unit 302 performs the process on the application 2 similarly to the application 1. In steps S605 and S606, upon receipt of the icon information request, the application 2 performs the similar process as the application 1.

After requesting icon information from all the installed applications, in step S607, the application management unit 302 requests the UI control unit to display the icon.

Figure 7:
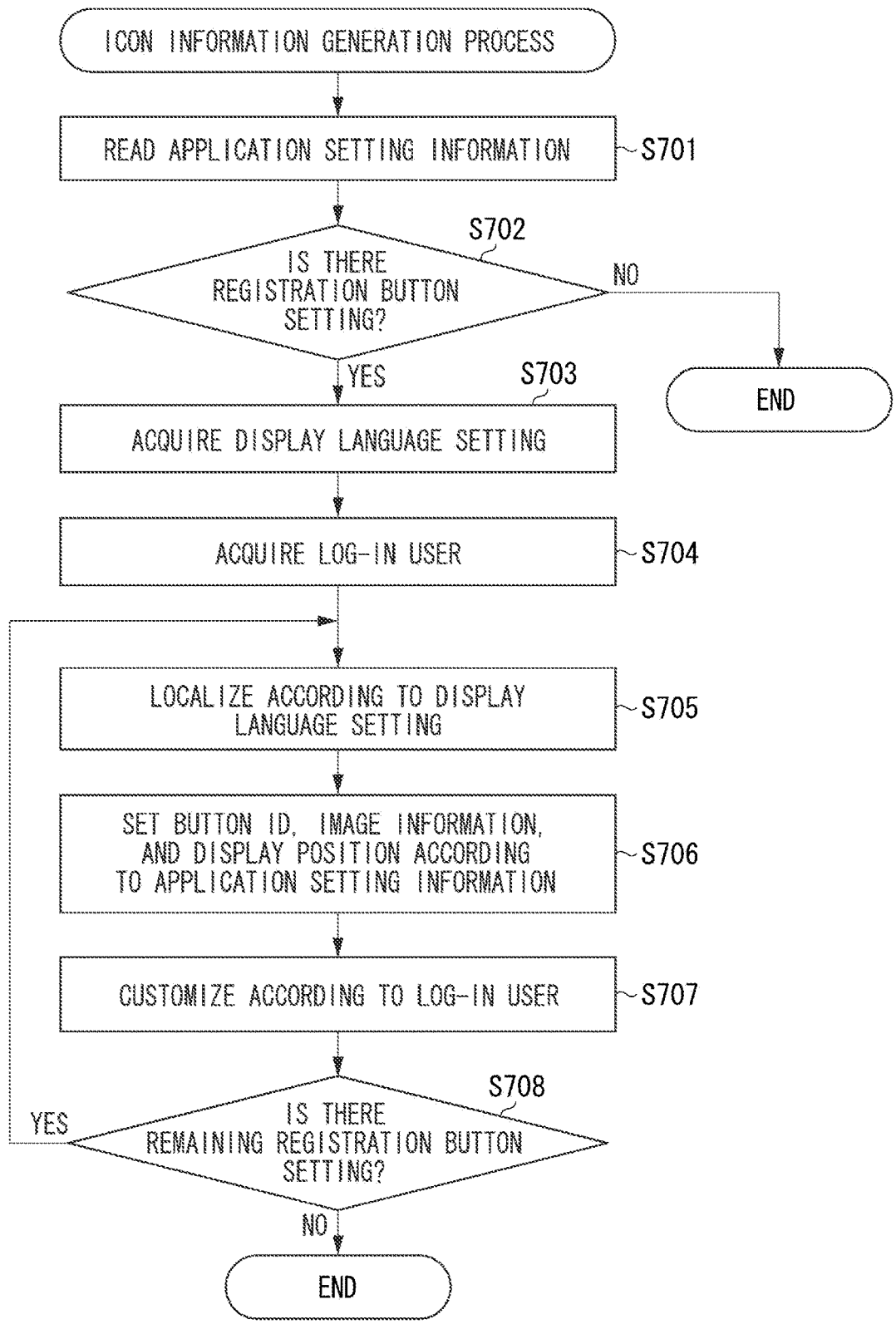
FIG. 7 is an example of a flowchart of an icon information generation process according to one or more aspects of the present disclosure.

FIG. 7 is an example of a flowchart of the icon information generation process according to the present exemplary embodiment.

This process is also executed under the control of the CPU 101. FIG. 7 illustrates the flow of the icon information generation process (steps S602 and S605) performed by the application 1 or 2 in FIG. 6. As an example of an application, the icon information generation process performed by a form print application 1 or 2 for printing form image data registered by the user is described. Although the details of the process vary depending on the kind of the application, the main contents are the same as the steps illustrated here.

In this example, the form print application is described on the assumption that the form printing settings illustrated in FIG. 8 are registered in advance by the user. FIG. 8 is a diagram illustrating an example of application setting information according to the present exemplary embodiment. The settings illustrated in FIGS. 8 and 9 are registered and stored in the storage 104. In the settings, the "musical score" form is a pre-registered form as an application sample, and the "application" form is a form registered by the user.

In step S701, the application 1 reads application setting information from the memory via the storage control unit 306 to generate the icon information. Specifically, the application 1 reads the setting information illustrated in FIG. 8. In step S702, the application 1 checks if there is a registration button setting in the setting information. When there is no setting (No in step S702), the application 1 terminates the process. When there is a setting (Yes in step S702), the process proceeds to S703. In this example, there are two form settings as illustrated in FIG. 8, and the process proceeds to S703 to generate the icon information for musical score. In step S703, the application 1 acquires a display language setting in the image forming apparatus 401 to localize the icon title. In step S704, the application 1 acquires the user having logged into the image forming apparatus 401 to customize the icon for the log-in user. The acquired user will be designated as user A. In step S705, the application 1 then localizes the icon title according to the acquired display language setting. The musical score form is a form registered in advance in the application and the information for localizing the icon title is prepared by the application. The application 1 localizes the icon title according to the display language setting based on the localization information. In step S706, the application 1 sets the button identification (ID), the icon image information, and the display position. For the musical score form, the button ID is 0, the icon image information is pixel data stored in ICON1.DAT, and the display position is the top. In step S707, the application 1 customizes the icon according to the log-in user. The application 1, as a form print application, has an item 808 for setting which user can use which of the forms. The application 1 compares the information about the users set in this item to information about the current log-in user acquired in step S704. When there is a match between the compared information, the application 1 generates the icon information. When there is no match, the application 1 discards the icon information. Since all the users can use the musical score form, the application 1 generates the icon information. In step S708, the application 1 checks there is a remaining registration button setting. When there is any remaining registration button (Yes in step S708), the processing returns to step S705 in which the application 1 generates the next icon information. When there is no remaining registration button (No in step S708), the application 1 terminates the process. In this example, since the application form remains, the process returns to step S705. In step S705, the application 1 localizes the icon title. The application form is newly registered by the user and has no localization information. Accordingly, the application 1 sets the title registered by the user as it is. In step S706, the application 1 sets the button ID, the icon image information, and the display position. For the application form, the button ID is 1, the icon image information is pixel data stored in ICON2.DAT, and the display position is the end. In step S707, the application 1 customizes the icon according to the local user. Only the user A can use the application form. If the user acquired in step S704 is the user A, the application 1 generates the icon information. If the user acquired in step S704 is not the user A, the application 1 discards the icon information. In this example, the application 1 generates the icon information as the acquired user is the user A. Finally, if there is no remaining setting information (No in step S708), the application 1 terminates the process. FIG. 9 illustrates the icon information generated by the application 1 or 2 through the foregoing process from the information illustrated in FIG. 8. FIG. 9 is a diagram illustrating an example of icon registration information according to the present exemplary embodiment.

FIG. 8 illustrates the setting information for the form print application used as a sample in the icon information generation process illustrated in FIG. 7. The form print application performs the process according to these settings. Form name 801 represents the name indicating contents of a form and registered by the user. Button ID represents the ID for identification of an icon, which is used to identify the pressed button. Form image file 803 represents the image file to be printed by form printing, which is registered by the user. Print setting 804 represents information about the color mode and the number of copies for form printing, and is registered by the user. Icon information file 805 represents the file holding the icon image, and is registered by the user. Localize 806 represents information used for localization of the icon title, which is referred to for localization of a sample musical score form prepared in advance by the application. The form registered by the user has no localization information. Display position 807 specifies the display position of an icon.

FIG. 9 illustrates the icon information generated with the sample in the icon information generation process illustrated in FIG. 7. Application ID 901 represents the ID for identifying an application. Each application is assigned an ID at the time of application development. Button ID 902 represents the ID for identifying a button. Icon title 903 represents the title for displaying an icon. Display position 904 represents the initial display position of an icon, which is specified as top or tail. Icon image information 905 represents pixel information about an icon image. In the description of FIG. 7, when the application is not started by the user A in step S704, the icon information for the application form is not generated. In other words, the icon information is not registered.

Figure 10:
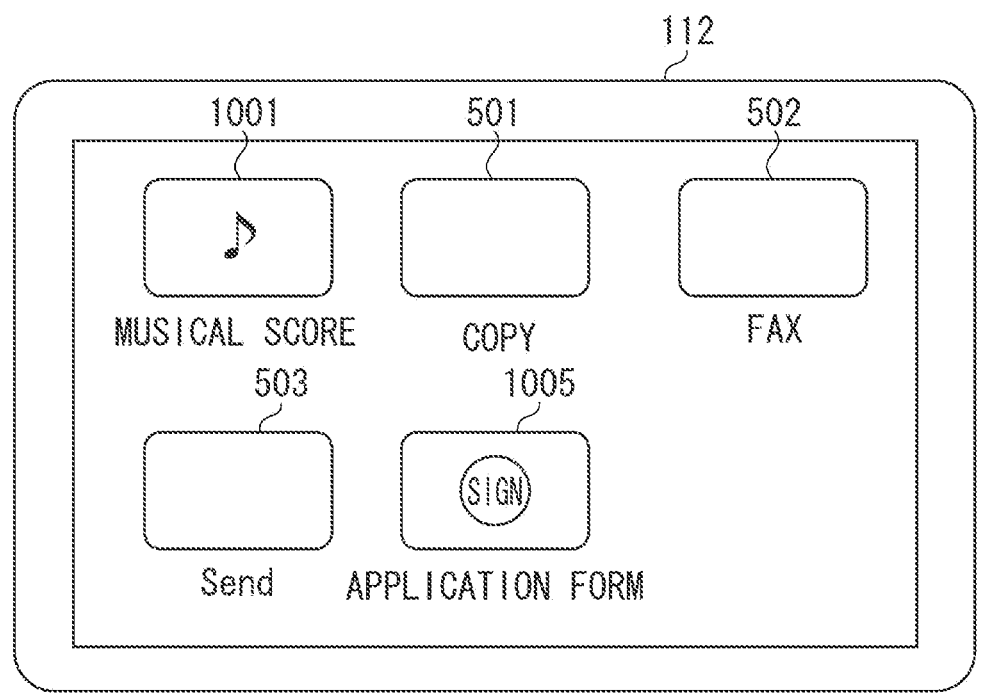
FIG. 10 is a diagram illustrating an example of display of an operation screen in the image forming apparatus according to one or more aspects of the present disclosure.

FIG. 10 is a diagram illustrating an example of display on the operation unit 112 of the image forming apparatus 401 according to the present exemplary embodiment. FIG. 10 illustrates an example of display of the icon information illustrated in FIG. 9 on the operation unit 112. In addition to the copy icon 501, the fax icon 502, and the send icon 503 as the standard functions illustrated in FIG. 5, a musical score icon 1001 and an application form icon 1005 are displayed. The musical score icon 1001 is placed at the top and the application form icon 1005 is placed at the tail. This placement is in accordance with the specification of the display position 807 in the icon information. FIG. 10 illustrates the results of the icon updating process performed by the application management unit 302 as illustrated in FIG. 11.

Figure 11:
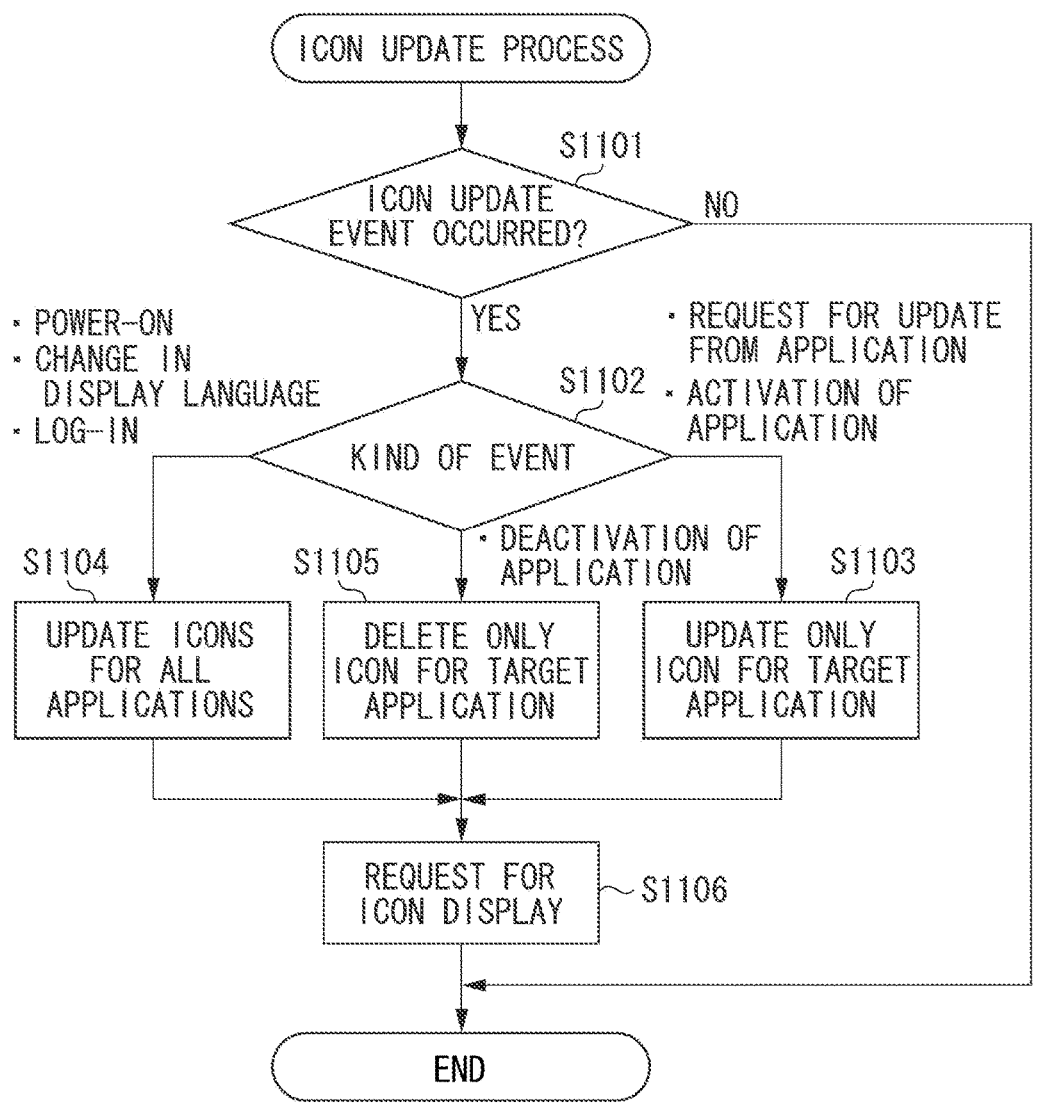
FIG. 11 is a flowchart illustrating an icon update process according to one or more aspects of the present disclosure.

FIG. 11 illustrates a flow of an icon update process S600 performed by the application management unit 302 illustrated in FIG. 6. This process is executed under the control of the CPU 101.

In step S1101, the application management unit 302 determines whether an icon update event has occurred. The icon update event is a predetermined event that causes an icon update. The predetermined event will be described below in step S1102. When no event has occurred (No in step S1101), the application management unit 302 terminates the process. When any event has occurred (Yes in step S1101), the process proceeds to S1102. In step S1102, the application management unit 302 determines the kind of the occurring event. If the event is one of power-on, change in display language, and log-in, the process proceeds to S1104. If the event is one of an update request from an application or activation of an application, the process proceeds to S1103. If the event is deactivation of an application, the process proceeds to S1105. In step S1103, the application management unit 302 updates the icon information for only the application that requests update or the application to be activated, and then the process proceeds to S1106. In step S1104, the application management unit 302 updates the icon information for all the applications, and the process proceeds to S1106. In step S1105, the application management unit 302 updates the icon information for only the application to be deactivated, and the process proceeds to S1106. In step S1106, based on the updated icon information, the application management unit 302 requests the UI control unit 303 to display the icon, and then terminates the process. The main part of the icon update process is common among steps S600, S1420, S1602, S1717, and S1805.

This processing method minimizes the update process to shorten the time taken for the icon information processing.

Figure 12:
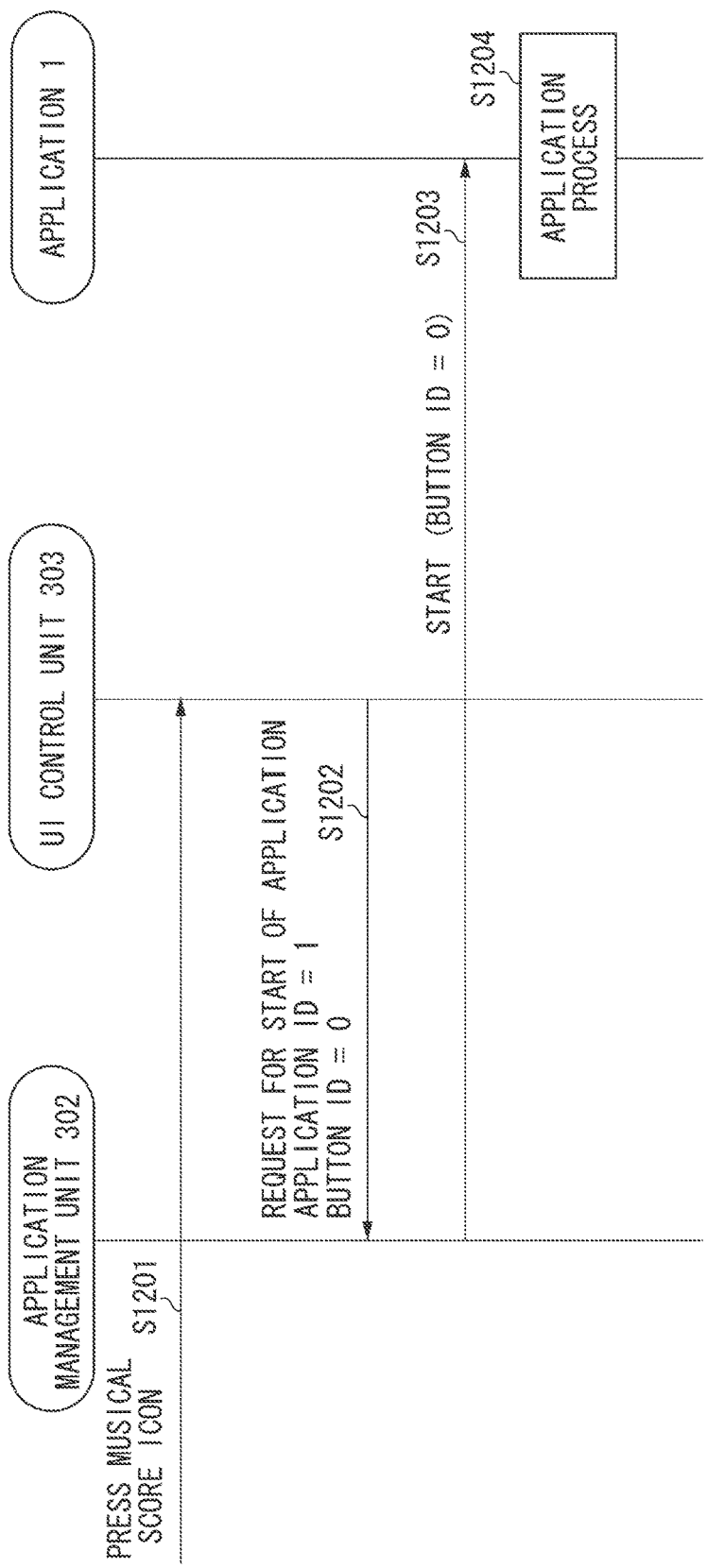
FIG. 12 is a sequence diagram illustrating an example of an application start sequence according to one or more aspects of the present disclosure.

FIG. 12 illustrates a process flow from a press of the musical score icon 1001 displayed on the operation unit 112 to the start of the application. This process is also executed under the control of the CPU 101.

In step S1201, when the user presses the icon, the UI control unit 303 detects the press of the icon. In step S1202, the UI control unit 303 acquires the application ID and the button ID from the icon information about the pressed icon, and sends to the application management unit 302 a request for starting the application together with the application ID and the button ID. In the case of the musical score icon, the application ID is 1 and the button ID is 0. In step S1203, the application management unit 302 acquires the application matching the received application ID from an application ID management table illustrated in FIG. 13, and passes the button ID to the matching application to start the application. In this case, the application 1 matches with the application ID of 1. When the application is started, in step S1204, the application management unit 302 recognizes which button has been pressed from the passed button ID information, and performs a process according to the button. In the case of the form print application, the application management unit 302 reads the setting information illustrated in FIG. 8 to acquire the setting matching the button ID of 0. Then, the application management unit 302 prints the form image file SCORE-.DAT set with the button ID of 0, with the print setting Setting1.dat.

FIG. 13 is a diagram illustrating an example of application management information according to the present exemplary embodiment. FIG. 13 illustrates a table for managing the information about the applications installed in the image forming apparatus 401. Application ID 1301 is an item for holding the IDs for identifying the installed applications. Application 1302 represents the application corresponding to the application ID. The information is updated at the time of installation or uninstallation of each application.

Figure 15:
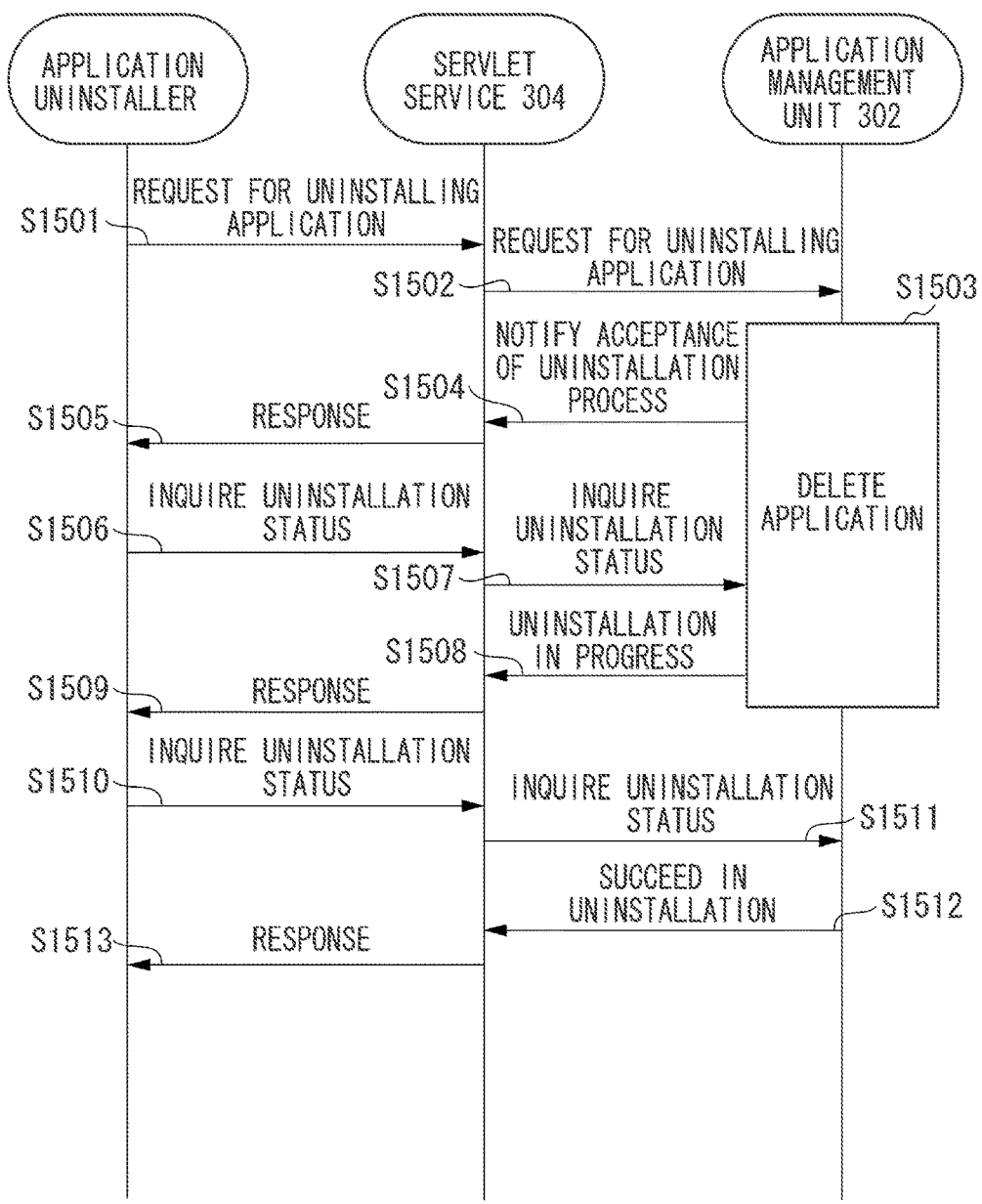
FIG. 15 is a sequence diagram illustrating an example of an uninstallation sequence according to one or more aspects of the present disclosure.
Figure 16:
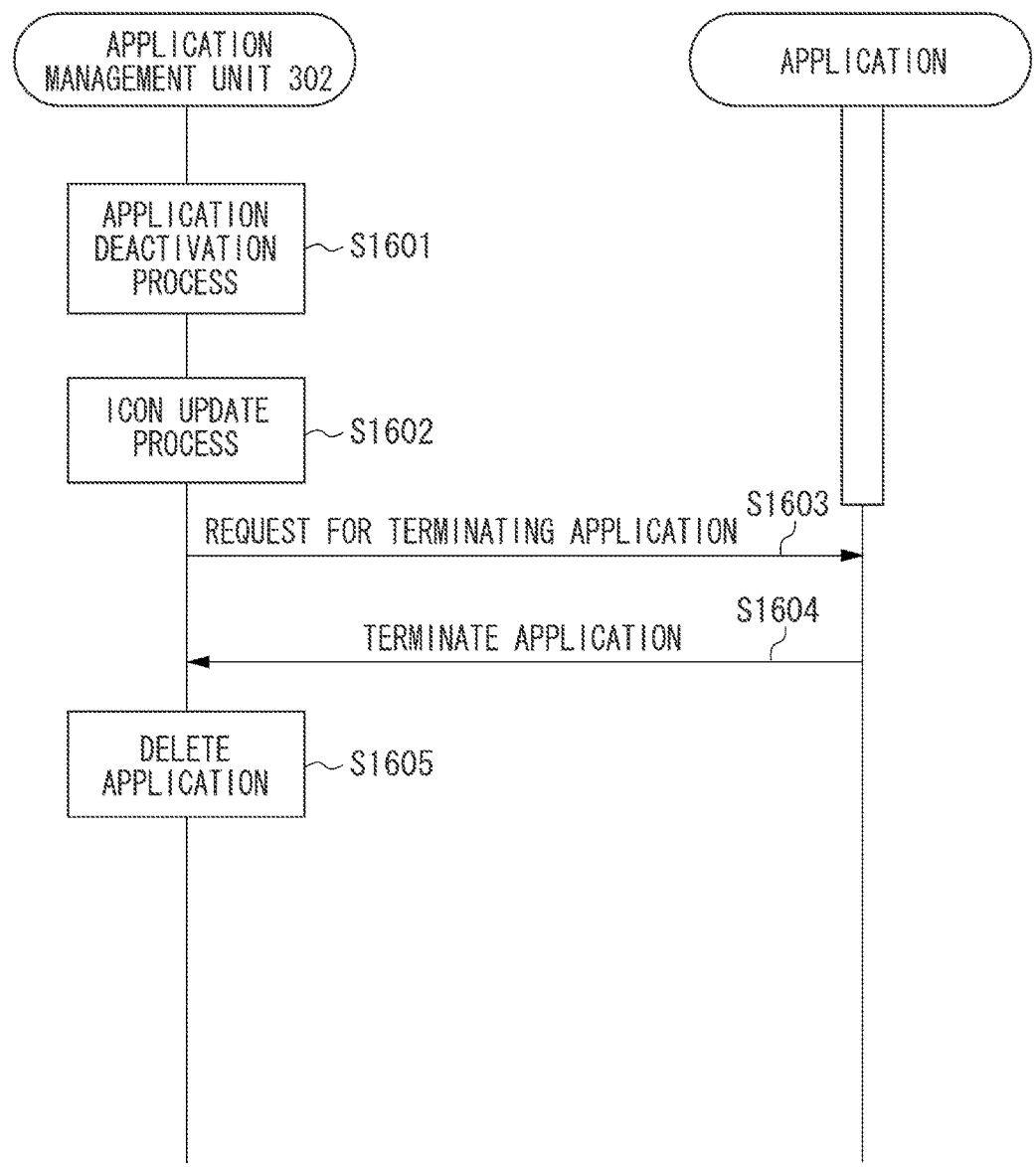
FIG. 16 is a sequence diagram illustrating an example of an application deletion sequence according to one or more aspects of the present disclosure.

FIG. 14 is a diagram illustrating an example of an application installation flow. The processes illustrated in FIGS. 14, 15, and 16 are executed under the control of the CPU 101. In step S1401, the servlet service 304 receives an application installation request from an application installer operating on the external device 403. In step S1402, the servlet service 304 requests the application management unit 302 to perform the process. In step S1403, in response to the application installation request, the application management unit 302 writes application data included in the request via the storage 104. In step S1404, upon completion of the writing, the application management unit 302 returns a notification of acceptance of the installation process. In step S1405, the application management unit 302 installs the application. The application data includes the application ID and the data of the application. Based on the information, the application management unit 302 adds the information about the installed application to the application management table illustrated in FIG. 13. In step S1406, the servlet service 304 returns the notification of acceptance of the installation process as a response. In step S1407, the servlet service 304 receives an inquiry about installation status from the application installer. In step S1408, the servlet service 304 requests the application management unit 302 to perform the process. The application management unit 302 checks the installation status in response to the inquiry about the installation status. In step S1409, the application management unit 302 returns a notification that the application is being installed since the application installation process in step S1405 is being executed. In step S1410, the servlet service 304 returns the notification that the application is being installed as a response. In step S1411, the application installer makes an inquiry about the installation status again. In step S1412, the servlet service 304 requests the application management unit 302 to perform the process. The application management unit 302 checks the installation status. In step S1405, the application installation process is completed. In step S1413, the application management unit 302 returns a notification that the installation has succeeded. In step S1414, the servlet service 304 returns the notification of the success of the installation as a response. In step S1415, the application installer makes an application activation request to activate the installed application. In step S1416, the servlet service 304 requests the application management unit 302 to perform the process. In step S1417, the application management unit 302 activates the requested application. In step S1419, the application management unit 302 notifies the servlet service 304 of the success of the activation. In step S1421, the servlet service 304 returns the notification of the success of the activation as a response. In step S1420, the application management unit 302 performs the icon update process. This process is illustrated in FIG. 11. The application management unit 302 issues the notification of the success of the activation and executes the processes in steps S1103 and S1106 illustrated in FIG. 11. When the application is installed but is not activated in step S1417, the icon update process is not performed. The icon update process is performed with the activation of the application in step S1417 as a condition.

FIG. 15 illustrates an example of a flow of application uninstallation. In step S1501, the servlet service 304 receives an application uninstallation request from an application uninstaller running on the external device 403. In step S1502, the servlet service 304 requests the application management unit 302 to perform the process. In step S1503, upon receipt of the application uninstallation request, the application management unit 302 starts an application delete process. In step S1504, the application management unit 302 returns the notification of acceptance of the uninstallation process to the servlet service 304. In step S1505, the servlet service 304 returns the notification of acceptance of the uninstallation process as a response. In step S1506, the servlet service 304 receives an inquiry about the uninstallation status from the uninstaller. In step S1507, the servlet service 304 requests the application management unit 302 to perform the process. In step S1508, the application management unit 302 returns a notification that the application is being uninstalled. In step S1509, the servlet service 304 returns the notification that the application is being uninstalled as a response. In step S1510, the servlet service 304 receives an inquiry about the uninstallation status from the uninstaller. In step S1511, the servlet service 304 requests the application management unit 302 to perform the process. In step S1512, the application management unit 302 notifies the success of the uninstallation. In step S1513, the servlet service 304 returns the notification of the success of the uninstallation as a response. According to this process, the processes in steps S1105 and S1106 illustrated in FIG. 11 are performed.

FIG. 16 is a diagram illustrating an example of the application deletion flow in step S1503 illustrated in FIG. 15. In step S1601, the application management unit 302 deactivates the target application. In step S1602, the application management unit 302 then performs the icon update process to update the icon for the deactivated application. This process is illustrated in FIG. 11. In step S1603, the application management unit 302 then makes a termination request to the target application. In step S1604, upon receipt of the termination request, the application is terminated. In step S1605, upon completion of the termination of the application, the application management unit 302 deletes the application data. According to this process, the application is deactivated and the icon is updated and deleted.

Figure 17:
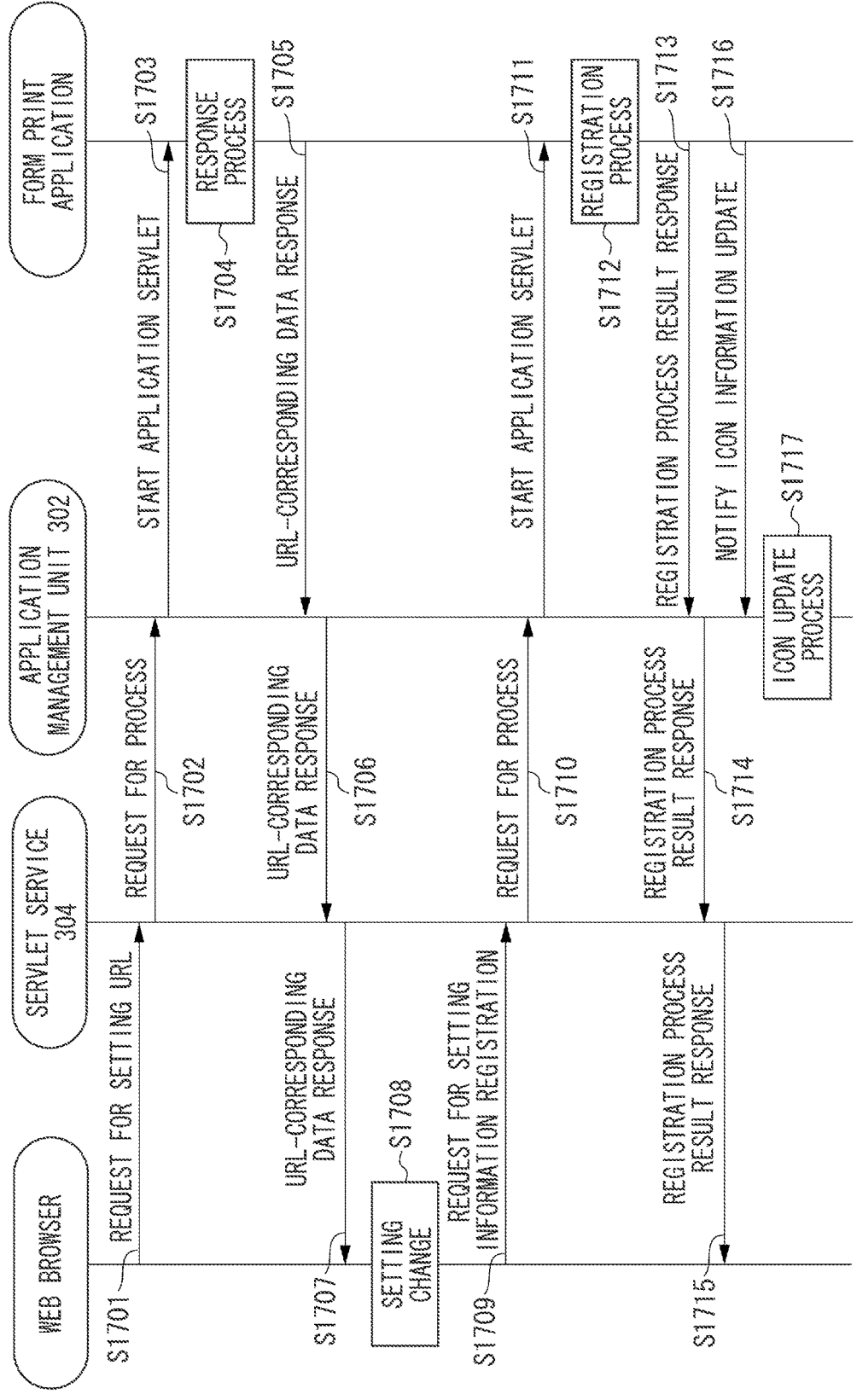
FIG. 17 is a sequence diagram illustrating an example of an application setting sequence according to one or more aspects of the present disclosure.

FIG. 17 is a diagram illustrating an example of an application setting sequence according to the present exemplary embodiment.

The process illustrated in FIG. 17 is performed under the control of the CPU 101.

FIG. 17 is a diagram illustrating the application setting flow. The icon information generation process in the form print application for printing form image data registered by the user will be described as an example of an application. Although the details of the process vary depending on the kind of the application, the main contents are the same as the steps illustrated here.

The application is set as described below. A web browser running on the external device 403 connects to the image forming apparatus 401 so that the image forming apparatus 401 makes settings via the web browser. In step S1701, the web browser requests the servlet service 304 for a setting URL for setting the application. In step S1702, the servlet service 304 requests the application management unit 302 to perform the process. In step S1703, the application management unit 302 identifies the application from the requested URL and starts the application servlet for the application. In step S1704, the application makes a response to the URL request. In this case, the application prepares for returning a HyperText Markup Language (HTML) resource to the setting URL. An HTML form is described in the HTML resource. The HTML form is used for referring to and setting the information illustrated in FIG. 8 necessary for the form print process. In step S1705, the application returns the prepared HTML resource as a response. In step S1706, the application management unit 302 returns the received response as it is to the servlet service 304. In step S1707, the servlet service 304 returns the received response as it is. The user edits the screen displayed on the web browser to change the application settings. In step S1708, the application accepts the setting change. In this example, a new print form is registered. In step S1709, the web browser sends a setting information registration request made by the user's operation to the servlet service 304. In step S1710, the servlet service 304 requests the application management unit 302 to perform the process. In step S1711, the application management unit 302 identifies the application from the requested URL and starts the application servlet for the application. In step S1712, the application makes a registration from the request sent from the web browser. The form print application adds a line to the setting information illustrated in FIG. 8. In step S1713, the application returns the results of the registration as a response. In step S1714, the application management unit 302 returns the received response as it is. In step S1715, the servlet service 304 returns the received response as it is. In step S1706, the application sends a notification of icon information update to the application management unit 302 to register the icon for the registered form. In step S1717, the application management unit 302 performs the icon update process. This process is illustrated in FIG. 11. By this process, the application can change the icon registration according to the setting state.

Figure 18:
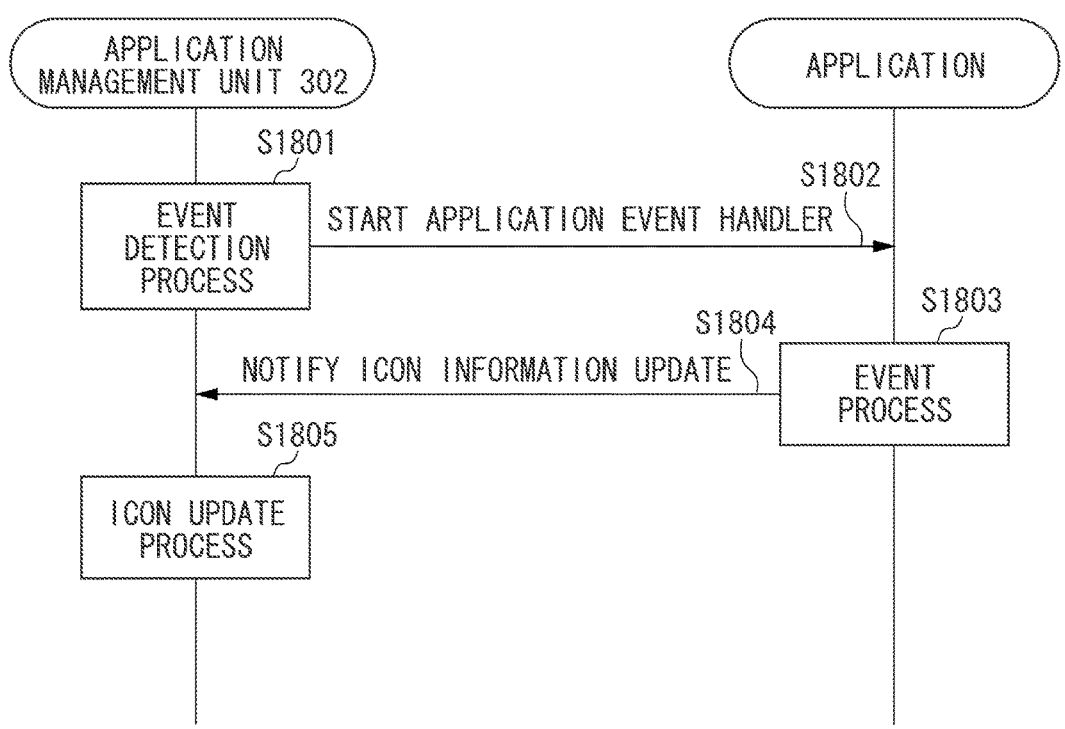
FIG. 18 is a flowchart illustrating an example of a flow of changing icons depending on a change in a state of the image forming apparatus or a state of a device according to one or more aspects of the present disclosure.

FIG. 18 illustrates an example of a flow of changing icons depending on changes in the state of image forming apparatus or the state of an externally connected device. As an example of an application, the operations of a consumable supply purchase promotion application are described. The application prompts the user to purchase consumable supplies of the image forming apparatus when remaining amounts of the consumable supplies are low. Although the details of the process vary depending on the kind of the application, the main contents are the same as the steps illustrated here. The following process is basically executed by the application management unit 302 or the application under the control of the CPU 101.

Figure 21:
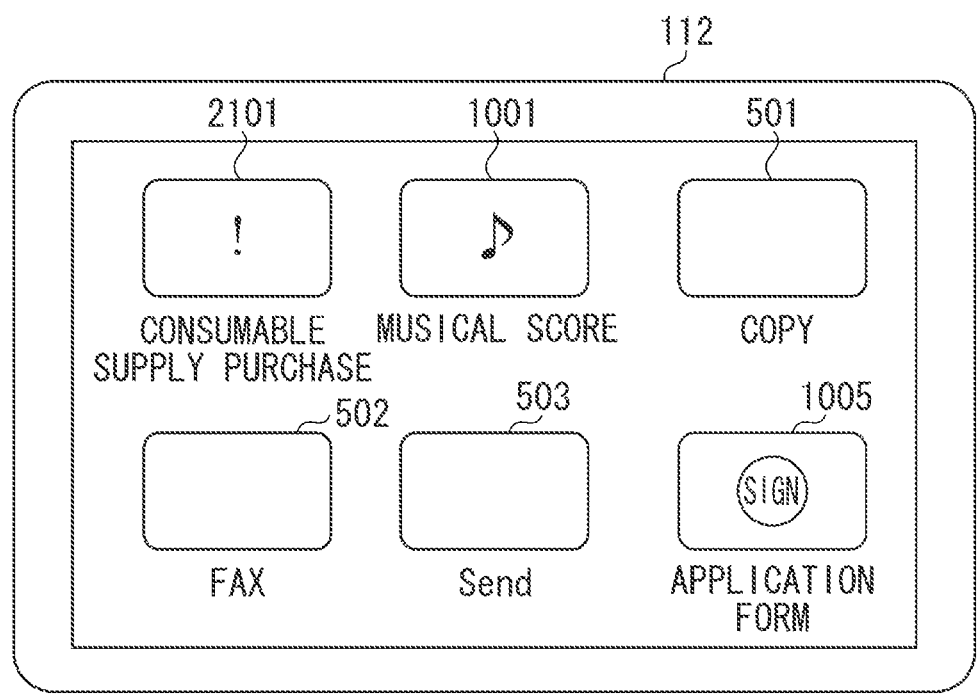
FIG. 21 is a diagram illustrating an example of an operation screen in the image forming apparatus according to one or more aspects of the present disclosure.

In step S1801, the application management unit 302 performs an event detection process to determine whether a predetermined event has occurred in the image forming apparatus 401. The event detection process will be described below. In this example, a consumable supply state change event has occurred. When the predetermined event has occurred, in step S1802, the application management unit 302 starts an event handler of the application with which the event handler is registered. At that time, the application management unit 302 notifies the event handler of, as a parameter, event information indicating what event has occurred. The event handler of the application performs the process according to the provided event information. The consumable supply purchase promotion application checks the respective remaining amounts of the consumable supplies and determines whether the consumable supplies are to be purchased based on the remaining amounts and consumption paces. When determining that the consumable supplies are to be purchased, in step S1804, the application sends an icon information update notification to the application management unit 302. In step S1805, upon receipt of the icon information update notification, the application management unit 302 performs the icon update process. FIG. 21 illustrates an example of display on the operation unit 112 resulting from this process. FIG. 21 will be described below.

This process enables the icon information to be updated depending on changes in the state of the image forming apparatus 401. In addition, the process performed by the event handler enables the icon information to be updated depending on the state of an externally connected device.

Figure 19:
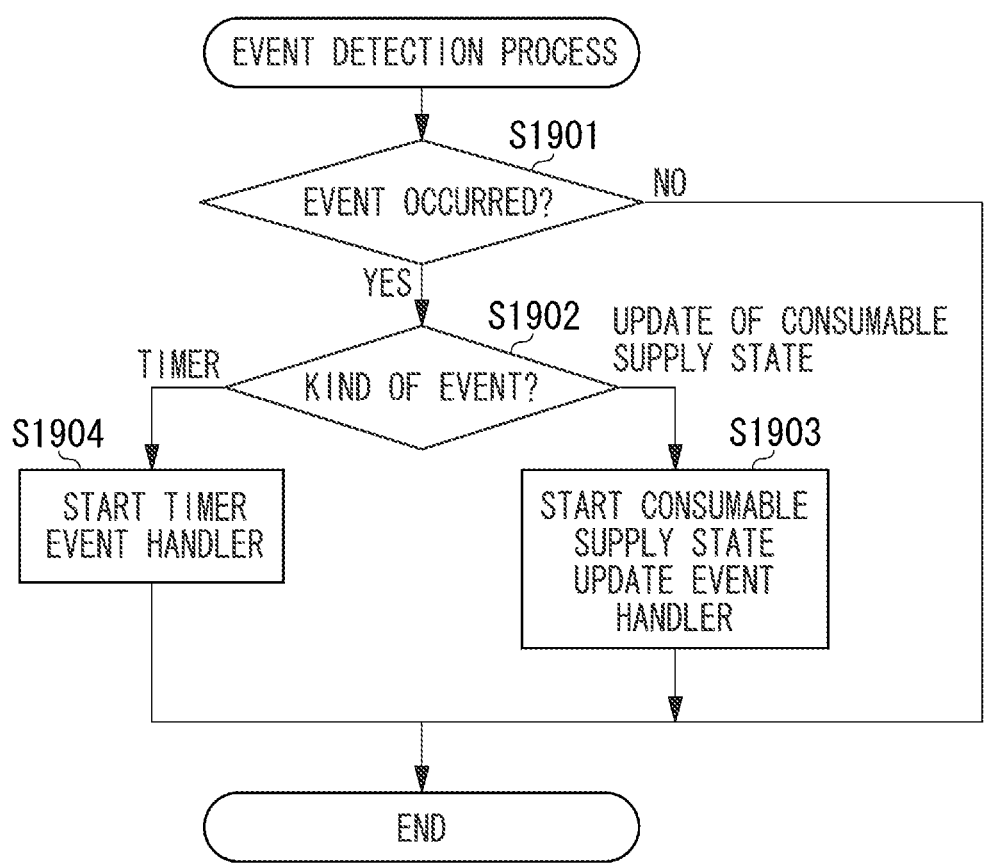
FIG. 19 is a flowchart illustrating an example of a flow of an event detection process S1801 in FIG. 18.

FIG. 19 illustrates a flow of the event detection process S1801 illustrated in FIG. 18. This process is performed under the control of the CPU 101. First, the application management unit 302 checks whether a predetermined event has occurred. When no event has occurred (No in step S1801), the application management unit 302 terminates the process. When the event has occurred (Yes in step S1801), the processing proceeds to step S1902. In step S1902, the application management unit 302 determines the kind of the event. When the event is a timer event, the process proceeds to S1904. When the event is a consumable supply state update, the process proceeds to step S1903. In step S1904, the application management unit 302 starts a timer event handler registered in advance and terminates the process. In step S1903, the application management unit 302 starts a consumable supply state update event handler registered in advance and terminates the process.

By detecting an event in the image forming apparatus 401 and starting the event handler of the application only at the occurrence of the event, it is possible to suppress the consumption of the resource in the image forming apparatus 401 as compared to the case in which the application is resident for event detection.

FIG. 20 illustrates an example of meta-information in application that is referred to by the image forming apparatus 401 for registration of events in each application. The meta-information includes ID (2001) for identifying the application, the application name (2002), the application version (2003), and the event handler information (2004) to be processed by the application. The event handler information includes the type information (2005 and 2008) indicating the type of the event, the script name of the event handler (2006 and 2009), and the function name of the event handler (2007 and 2010). The timer period (2011) is specified for the timer event. In this example, as a handler for processing the consumable supply state update event, handlerA script and handlerA function are registered. As a handler for processing the timer event, handlerB script and handlerB function are registered. In addition, the timer interval is registered to 60 seconds.

FIG. 21 illustrates an example of display on the operation unit 112 with additional registration of an icon. The display on the operation unit 112 is controlled according to the flow illustrated in FIG. 18 starting from the icon display state illustrated in FIG. 10. A consumable supply purchase icon 2101 is additionally registered in the icon update process S1805 in FIG. 18. The existing icons are shifted in position because of the addition of the consumable supply purchase icon 2101.

As described above, according to the present exemplary embodiment, the information processing apparatus as an example of the image forming apparatus 401 has the application 1 or the application 2 installed to extend the functionality. Display items as examples of icons are displayed on the operation unit 112 as an example of a display unit in the image forming apparatus 401. The storage 104 stores the display information corresponding to the display items related to the application 1 or 2. FIG. 9 illustrates an example of display information. The storage 104 is a hard disk drive (HDD) or a solid state drive (SSD).

The application management unit 302 has been described as an example of a control program running on the operating system 201 and a framework for managing the applications. The CPU 101 executes the application management unit 302 or the UI control unit 303 as a control program to display and update the foregoing icons. Specifically, in response to the occurrence of an event in the application 1 or 2, the CPU 101 updates the display of the icons with reference to the display information illustrated in FIG. 9 and the like.

After the installation of the application 1 or 2, when an event occurs with the activation of the application, the icon corresponding to the application 1 or 2 is displayed and updated to be operative.

The image forming apparatus 401 is loaded with the applications 1 and 2, and the framework (the application management unit 302) accepts events from the applications 1 and 2. Then, the application management unit 302 notifies the update of the icons relating to the applications 1 and 2 corresponding to the events.

When the event is an event relating to at least one of power-on, change in display language, and log-in, the icons corresponding to the applications 1 and 2 installed in the image forming apparatus 401 are not updated. When the event is at least one of an update request from the application and the activation of the application, the icon for one of the applications 1 and 2 for which the event has been issued is updated. Then, the icon relating to the other of the applications 1 and 2 is not updated. The CPU 101 executes display control in such a manner as described above.

When the event is an event relating to the deactivation of the application 1 or 2, the icon for the application to be deactivated is deleted.

Further, the application 1 may be a form application or an application for managing the status of the image forming apparatus 401. The event is the registration of a form or the occurrence of an error in the image forming apparatus 401.

The applications 1 and 2 may each manage the display information as illustrated in FIG. 9 in the storage 104. The application management unit 302 as an example of a control program providing a framework may acquire the information illustrated in FIG. 9 in response to the occurrence of a predetermined event in the image forming apparatus 401. The examples of the predetermined event are illustrated in steps S1103 to S1105.

The icons for starting applications as programs are registered in the operating system or the like at the installation of the applications. Some of the applications may not be started because the conditions for starting the applications are not sufficiently satisfied at the time of installation. Even icons for such applications can be registered at the time of installation of the applications. The application may detect changes in the image forming apparatus and external devices, and register and change icons depending on the state changes. In this case, an application for monitoring state changes may not have to be constantly active. Even in the image forming apparatus with a limited resource, icons can be registered and changed depending on the state changes.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-156321, filed Aug. 9, 2016, which is hereby incorporated by reference herein in its entirety.

What is claimed is:

1. An information processing apparatus loaded with an application for extending functionality of the information processing apparatus, the information processing apparatus comprising:
   a display device;
   at least one processor, when the processor executes instructions, which acts as:
   a setting unit configured to set the information processing apparatus to allow a plurality of tasks executed by one application to be registered and, according to receiving registration of the task, display an icon corresponding to the task on the display device;
   a control unit configured to, according to receiving an execution instruction corresponding to the icon displayed on the display device, execute a task of the application set for the icon;
   a detection unit configured to detect whether an event that a state of the information processing apparatus is changed has occurred;
   an identification unit configured to identify an application corresponding to the event detected by the detection unit;
   an obtaining unit configured to obtain an icon information corresponding to the identified application; and
   an updating unit configured to update the displayed icon, using the icon information obtained by the obtaining unit.

2. The information processing apparatus according to claim 1, wherein the control unit controls a process for not displaying the display item relating to the application on the display device in response to an installation of the application but displaying the display item corresponding to the application on the display device in response to occurrence of an event of activating the application thereafter.

3. The information processing apparatus according to claim 1, wherein further according to booting of the information processing apparatus, icons corresponding to the registered tasks are updated on a touchscreen configured to display and accept an operation.

4. The information processing apparatus according to claim 1, wherein the information processing apparatus is an image forming apparatus controlling a print process, the application is a form application or an application for managing status of the image forming apparatus.

5. The information processing apparatus according to claim 1, wherein a plurality of applications each manages display information.

6. The information processing apparatus according to claim 1, wherein the registration of the task is the registration of a form used for printing.

7. A control method for a system including an information processing apparatus loaded with an application for extending functionality of the information processing apparatus, the control method comprising:
   setting the information processing apparatus to allow a plurality of tasks executed by one application to be registered and, according to receiving registration of the task, display an icon corresponding to the task on the display device;
   controlling, according to receiving an execution instruction corresponding to the icon displayed on the display device, executing a task of the application set for the icon;
   detecting whether an event that a state of the information processing apparatus is changed has occurred;
   identifying an application corresponding to the detected event;
   obtaining an icon information corresponding to the application corresponding to the detected event; and
   updating the displayed icon, using the obtained icon information.

* * * * *